(12) United States Patent
Kato

(10) Patent No.: US 6,366,386 B1
(45) Date of Patent: Apr. 2, 2002

(54) SCANNING OPTICAL DEVICE AND IMAGE FORMING APPARATUS USING THE SAME

(75) Inventor: Manabu Kato, Toda (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/594,523

(22) Filed: Jun. 16, 2000

(30) Foreign Application Priority Data

Jun. 17, 1999 (JP) ............................................ 11-170779

(51) Int. Cl.$^7$ .............................................. G02B 26/08
(52) U.S. Cl. ........................ 359/205; 359/207; 359/216; 359/571; 347/259; 347/261
(58) Field of Search ................................. 359/196–226, 359/19, 558, 563, 565, 566, 569–571; 347/258–262

(56) References Cited

U.S. PATENT DOCUMENTS

| | | | | |
|---|---|---|---|---|
| 6,038,053 A | * | 3/2000 | Kato | ........................... 359/205 |
| 6,222,661 B1 | * | 4/2001 | Takeuchi et al. | ............. 359/205 |

FOREIGN PATENT DOCUMENTS

| | | | | |
|---|---|---|---|---|
| EP | 0827004 A2 | 3/1998 | ........... | G02B/26/10 |
| JP | 10-68903 | 3/1998 | ........... | G01T/26/10 |

* cited by examiner

*Primary Examiner*—James Phan
(74) *Attorney, Agent, or Firm*—Fitzpatrick, Cella, Harper & Scinto

(57) ABSTRACT

A scanning optical device to be used for an image forming apparatus such as a laser beam printer or a digital copying machine comprises a light source, an optical deflector, a first optical system for leading the light beam emitted from the light source to the optical deflector, and a second optical system for focussing the deflected light beam on a surface to be scanned, typically a photosensitive drum surface. The second optical system has a diffraction optical element and forms a light spot on the surface by selectively using the light beam of a predetermined order of diffraction. The sum of the light quantities of the light beams of the orders of diffraction on the positive side, relative to the predetermined order of diffraction, is smaller than that of the light beams of the orders of diffraction on the negative side, for the diffracted light beams located remotest from the optical axis or any of the light beams located within the scope of scanning. Alternatively, the diffracted light beams located remotest from the optical axis satisfy the formula $$0.5 < (P_{m-1}/V_{m-1})/(P_{m+1}/V_{m+1}) < 2.0$$

where m is the predetermined order of diffraction, $P_x$ is the intensity of a diffracted light beam of the x-th order of diffraction, and $V_x$ is the scanning speed of a diffracted light beam of the x-th order of diffraction on the surface.

23 Claims, 9 Drawing Sheets

SCANNING OPTICAL DEVICE AND IMAGE FORMING APPARATUS USING THE SAME

BACKGROUND OF THE INVENTION

1. Field of the Invention

This invention relates to a scanning optical device. More particularly, it relates to a scanning optical device realized by using an optical system comprising a diffraction optical element for focussing one or more than one light beams that is deflected by a deflection element on a surface to be scanned. A scanning optical system according to the invention can suitably be used for an image forming apparatus utilizing an electrophotographic process such as a laser beam printer or a digital copying machine that is adapted to record image information by optically scanning a surface by means of one or more than one light beams.

2. Related Background Art

Optical scanners to be used for image-forming apparatus including laser beam printers (LBPs) and digital copying machines are adapted to cyclically deflect a light beam that is optically modulated according to an image signal and emitted from a light source by means of an optical deflector such as a rotary polygon mirror, converge the deflected light beam to a spot of light on the surface to be scanned of a photosensitive drum by means of an imaging optical system having an fθ feature and cause the light beam to scan the surface in order to record image information thereon.

FIG. 1 of the accompanying drawings is a schematic illustration of a known scanning optical system of the type under consideration, showing only principal portions thereof. Referring to FIG. 1, a divergent light beam emitted from a light source 91 is substantially collimated by a collimator lens 92, limited for its width by an aperture 93 and then made to enter a cylindrical lens 94 having a predetermined refractive power only in the sub-scanning direction. The substantially collimated light beam entering the cylindrical lens 94 leaves the latter, keeping the substantially collimated state in the main-scanning plane. It is, however, converged in the sub-scanning plane and focussed on a deflecting plane (reflecting plane) 95a of an optical deflector 95, which is a rotary polygon mirror, to produce a substantially linear image extending in the main-scanning direction.

Then, the light beam deflected/reflected by the deflecting plane 95a of the optical deflector 95 is led to the surface (to be scanned) of a photosensitive drum 98 by way of a scanning optical system (fθ lenses) having an fθ feature to optically scan the surface of the photosensitive drum 98 in the direction of arrow B (main-scanning direction) in FIG. 1 as the optical deflector 95 is driven to rotate in the sense of arrow A in FIG. 1.

A number of scanning optical devices of the above described type have been proposed and many of them use plastic resin for the lenses of scanning optical system of the device because it is possible to accurately correct the aberration of a plastic resin lens and such a lens can be manufactured at low cost by injection molding.

However, a plastic lens shows large fluctuations in the aberration thereof (particularly in terms of off-focus and variance of magnification) when the environment changes and this problem is serious particularly when the scanning optical device is made to produce a spot of light having a very small diameter.

Recently, scanning optical devices using a diffraction optical element for the scanning optical system have been proposed to compensate the fluctuations of aberration that are specific to plastic lenses. Japanese Patent Application Laid-Open No. 10-68903 describes such an arrangement. According to the patent document, a diffraction optical element is used to generate chromatic aberration in order to compensate the change in the aberration due to a lowered refractive index of a plastic lens with the change in the aberration due to the fluctuations of the wavelength of a semiconductor laser operating as light source. Additionally, a diffraction optical element provide an advantage of showing a highly uniform thickness when formed by injection molding if it is used by itself.

While a diffraction optical element is very effective when used for the optical system of a scanning optical device, it is accompanied by a problem that the efficiency of use (as defined by the quantity of light output/quantity of light input for the designed order of diffraction=$\eta$, which is referred to as "diffraction efficiency $\eta$" hereinafter) varies depending on various conditions unlike a refraction optical element. This will be discussed below by using a diffraction grating model.

FIG. 2 is a schematic illustration of a diffraction grating model that can be used for a diffraction optical element. The diffraction optical element of FIG. 2 comprises a continuous grating showing a pitch p ($\mu$m) and a depth h ($\mu$m). The ratio of the pitch p to the depth h of the grating is referred to as aspect ratio AR. In other words, AR=grating pitch p/grating depth h.

The light beam striking the diffraction grating model with an angle of incidence of $\theta i$ is diffracted in the direction of the designed order of diffraction. However, when the grating pitch p is particularly small, the diffraction efficiency is theoretically aggravated to reduce the quantity of light for the designed order of diffraction on the surface to be scanned to make diffracted light of orders other than the designed order of diffraction (hereinafter referred to as "diffracted light of adjunctive orders of diffraction") noticeable and consequently give rise to undesired phenomena including those of flare and ghost.

FIG. 3 is a graph showing the aspect ratio dependency of the diffraction efficiency of the diffraction grating model of FIG. 2 when the angle of incidence $\theta i$ of light striking the grating (diffraction grating) is equal to zero, or $\theta i=0$. In FIG. 3, the aspect ratio AR is made to vary by changing the grating pitch p while holding the grating depth h to a constant value. From FIG. 3 it will be seen that the diffraction efficiency falls dramatically when the aspect ratio is made smaller than 4.

FIG. 4 is a graph showing the diffraction efficiency for the operational order of diffraction and those for the adjunctive orders of diffraction of the diffraction grating model of FIG. 2 when the aspect ratio=3.4 (pitch=10.2 $\mu$m and depth=3.0 $\mu$m) and the angle of incidence of light $\theta i$ relative to the grating=23°. Note that the diffraction efficiency is computed by using a technique of close-coupled wave analysis. The operational order of diffraction refers to the designed order of diffraction. Thus, a diffracted beam of light of the order is used and focussed to form a spot of light on the surface to be scanned.

Conventionally, the profile of the grating is determined only from the viewpoint of improving the diffraction efficiency of the diffraction grating for the operational order of diffraction. This will be discussed below by referring to FIG. 5.

FIG. 5 is a graph illustrating the change in the ratio of the quantity of diffracted light of the adjunctive orders of diffraction used for exposure (relative to the quantity of diffracted light of the operational order of diffraction used for exposure) that varies as a function of the blaze angle of diffraction grating under the above condition. It will be seen from FIG. 5 that the quantity of diffracted light of the adjunctive orders of diffraction of the negative side used for exposure increases when the blaze angle is smaller than the one that maximizes the diffraction efficiency of diffracted light of the operational order of diffraction. On the other hand, the quantity of diffracted light of the adjunctive orders of diffraction of the positive side used for exposure increases when the blaze angle is greater than the one that maximizes the diffraction efficiency of diffracted light of the operational order of diffraction. Then, the quantity of diffracted light of the operational order of diffraction is maximized at or near the blaze angle that equalizes the above two quantities. Conventionally, the quantity of diffracted light of the orders of diffraction of the positive side is made equal to that of the negative side in order to maximize the diffraction efficiency of diffracted light of the operational order of diffraction.

However, diffracted light of the adjunctive orders of diffraction of the positive side is more influential than that of the negative side in terms of flare and ghost so that the optical performance of known scanning optical devices can be degraded because of the following reasons.

(i) The extent of exposure is raised relative to the operational order of diffraction because of a slow scanning rate.

(ii) Diffraction is directed inwardly (and close to the optical axis of the scanning optical system) relative to the operational order of diffraction so that diffracted light inevitably enters the effective image area of the surface to be scanned. On the other hand, diffracted light of the adjunctive orders of diffraction of the negative side leaves the effective image area at a position near the position where the light beam remotest from the optical axis passes and diffracted light of the adjunctive orders is found to a large extent.

SUMMARY OF THE INVENTION

In view of the above described circumstances, it is therefore an object of the present invention to provide a scanning optical device that is free from the above identified problems and has a configuration that is simple but can enhance the uniformity of field illumination on the surface to be scanned and minimize the fluctuations of aberration due to various changes by reducing the influence of flare and ghost, Another object of the present invention is to provide a high definition image forming apparatus comprising a scanning optical device according to the invention and adapted to produce high quality images.

According to the invention, the above objects are achieved by providing a scanning optical device comprising:

a light source;

an optical deflector for deflecting the light beam emitted from said light source;

a first optical system for leading the light beam emitted from said light source to said optical deflector; and a second optical system for focussing the light beam deflected by said optical deflector on a surface to be scanned;

said second optical system having at least a diffraction optical element and being adapted to form a light spot on the surface to be scanned by using the diffracted light beam of a predetermined order of diffraction out of the light beams diffracted by the diffraction optical element, said diffraction optical element being so configured as to make the sum of the quantities of light of the diffracted light beams of the orders of diffraction of the positive side relative to the predetermined order of diffraction smaller than the sum of the quantities of light of the diffracted light beams of the orders of diffraction of the negative side relative to the predetermined order of diffraction for the light beams deflected by the optical deflector and located remotest from the optical axis.

In another aspect of the invention, there is also provided a scanning optical device comprising:

a light source;

an optical deflector for deflecting the light beam emitted from said light source;

a first optical system for leading the light beam emitted from said light source to said optical deflector; and a second optical system for focussing the light beam deflected by said optical deflector on a surface to be scanned;

said second optical system having at least a diffraction optical element and being adapted to form a light spot on the surface to be scanned by using the diffracted light beam of a predetermined order of diffraction out of the light beams diffracted by the diffraction optical element, said diffraction optical element being so configured as to make the sum of the quantities of light of the diffracted light beams of the orders of diffraction of the positive side relative to the predetermined order of diffraction smaller than the sum of the quantities of light of the diffracted light beams of the orders of diffraction of the negative side relative to the predetermined order of diffraction for any light beams located within the scope of scanning.

In still another aspect of the invention, there is also provided a scanning optical device comprising:

a light source;

an optical deflector for deflecting the light beam emitted from said light source;

a first optical system for leading the light beam emitted from said light source to said optical deflector; and a second optical system for focussing the light beam deflected by said optical deflector on a surface to be scanned;

said second optical system having at least a diffraction optical element and being adapted to form a light spot on the surface to be scanned by using the diffracted light beam of a predetermined order of diffraction out of the light beams diffracted by the diffraction optical element, said diffraction optical element being so configured as to satisfy the requirement of the formula below in terms of the light beams deflected by the optical deflector and located remotest from the optical axis;

$$0.5 < (P_{m-1}/V_{m-1})/(P_{m+1}/V_{m+1}) < 2.0,$$

m being the predetermined order of diffraction, $P_x$ being the intensity of a diffracted light beam of the x-th order of diffraction, $V_x$ being the scanning speed of a diffracted light beam of the x-th order of diffraction on the surface to be scanned.

In still another aspect of the invention, there is provided an image forming apparatus comprising:

a scanning optical device having the above features;

a photosensitive member arranged at the surface to be scanned;

a developing unit for developing an electrostatic latent image formed on the surface of said photosensitive member by the light beams made to scan the surface by means of said scanning optical device into a toner image;

a transfer unit for transferring said developed toner image onto a toner image receiving member; and a fixing unit for fixing the transferred toner image on the toner image receiving member.

DESCRIPTION OF THE PREFERRED EMBODIMENTS

[Embodiment 1]

Figure 1:
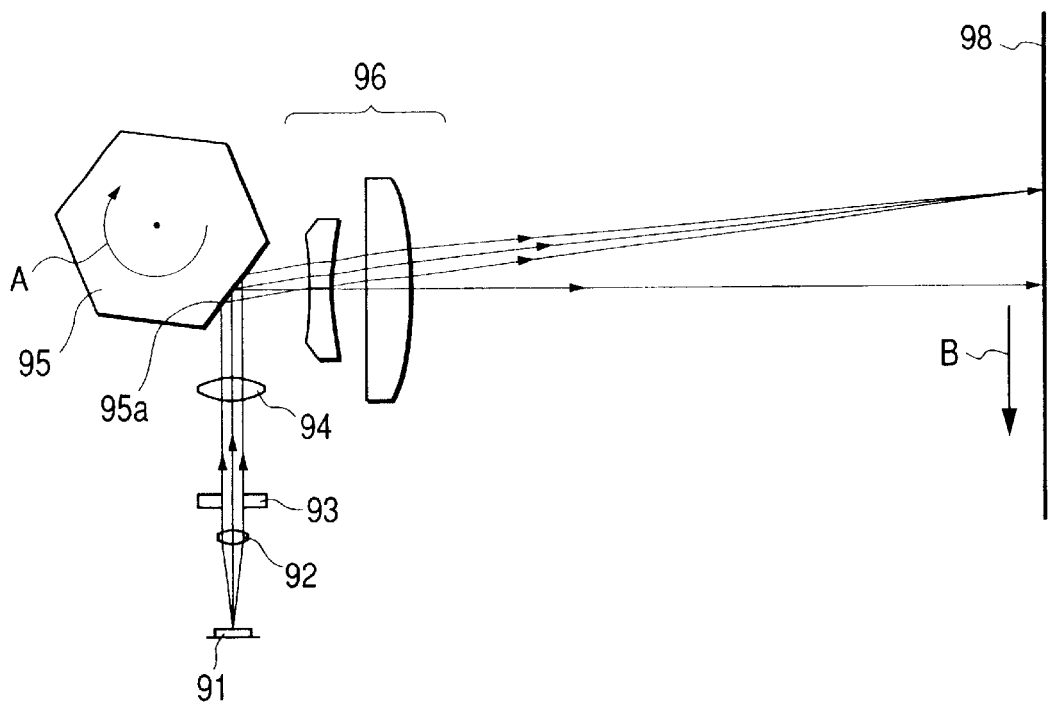
FIG. 1 is a schematic cross sectional view of a principal portion of a known multi-beam scanning optical device.
Figure 2:
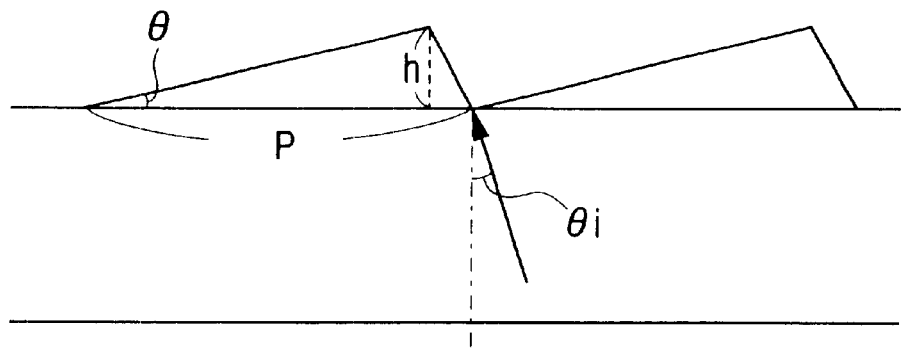
FIG. 2 is a schematic illustration of a diffraction grating model that can be used for a diffraction optical element.
Figure 3:
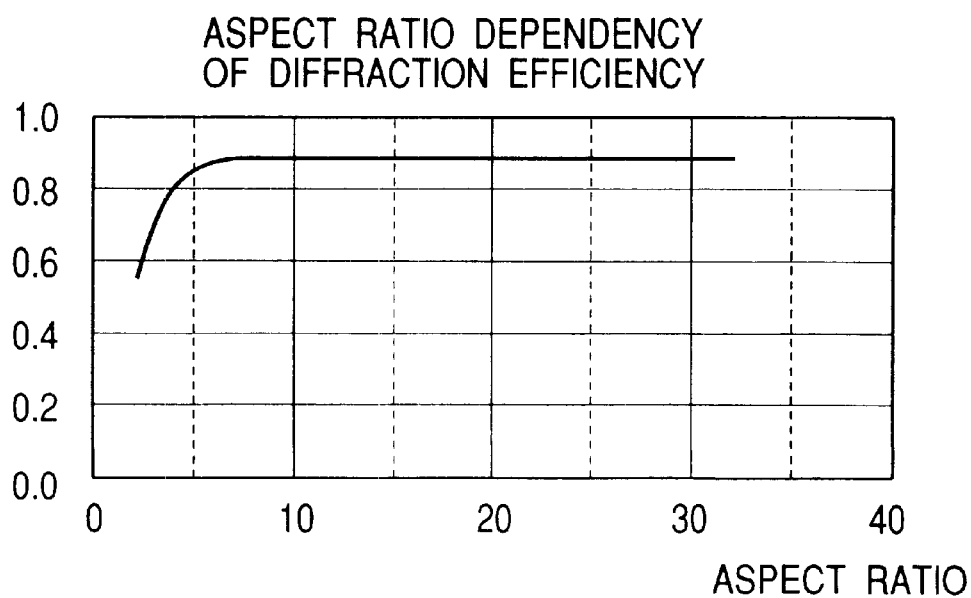
FIG. 3 is a graph showing the aspect ratio dependency of the diffraction efficiency of the diffraction grating model of FIG. 2.
Figure 4:
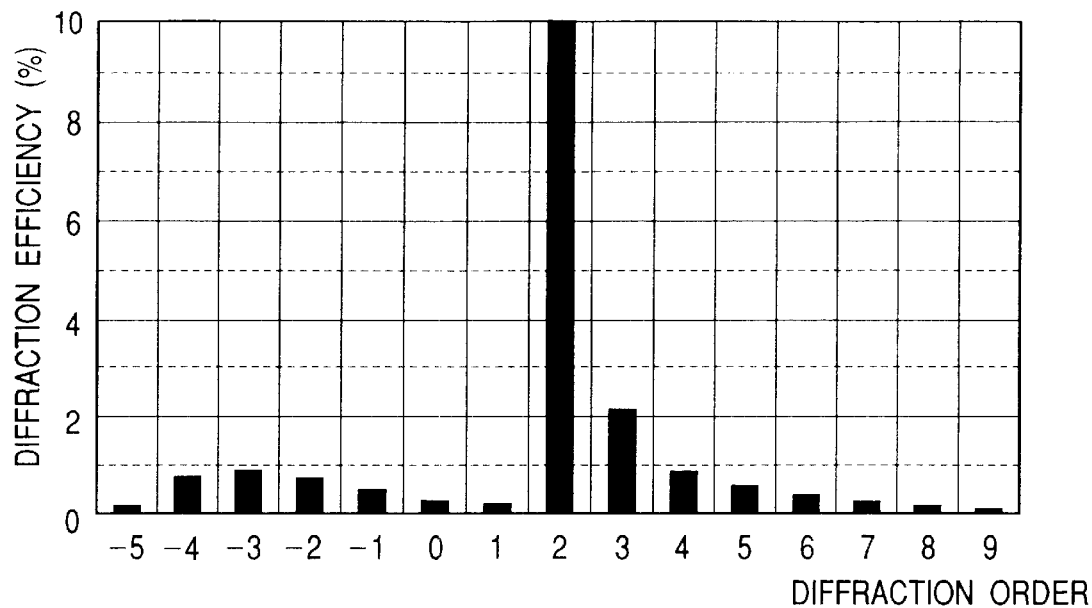
FIG. 4 is a graph showing the diffraction efficiency for the operational order of diffraction and those for the adjunctive orders of diffraction of a diffraction grating having a predetermined aspect ratio.
Figure 5:
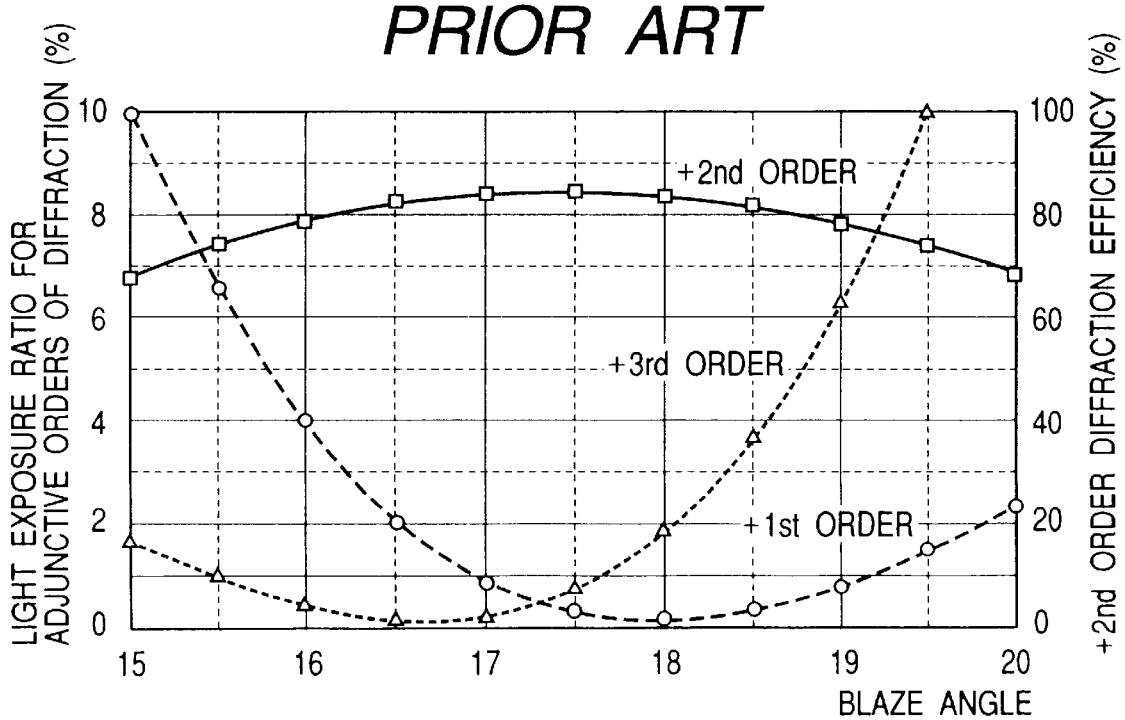
FIG. 5 is a graph illustrating the change in the ratio of the quantity of diffracted light of the adjunctive orders of diffraction used for exposure (relative to the quantity of diffracted light of the operational order of diffraction used for exposure) that varies as a function of the blaze angle of diffraction grating.
Figure 6:
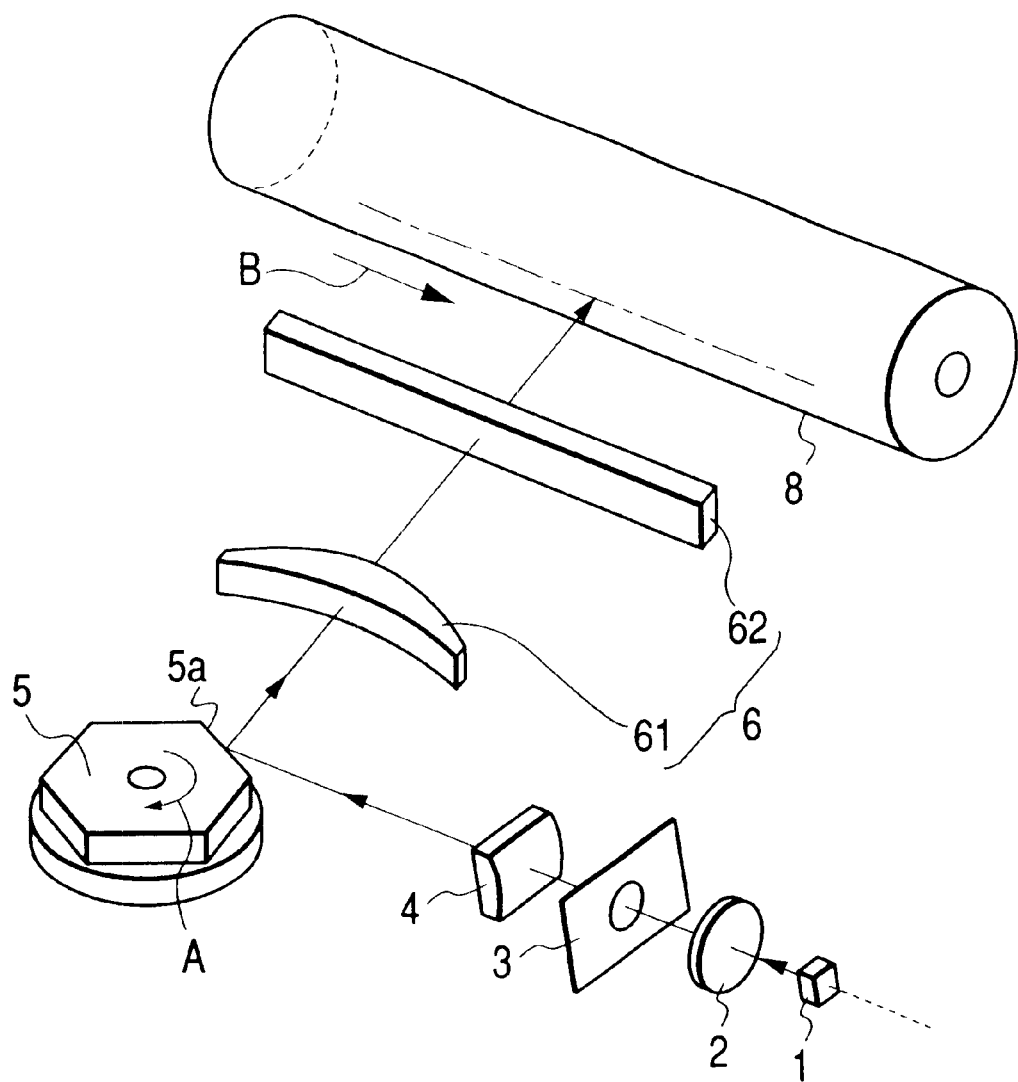
FIG. 6 is a schematic perspective view of principal components of Embodiment 1 of scanning optical device according to the invention.
Figure 7:
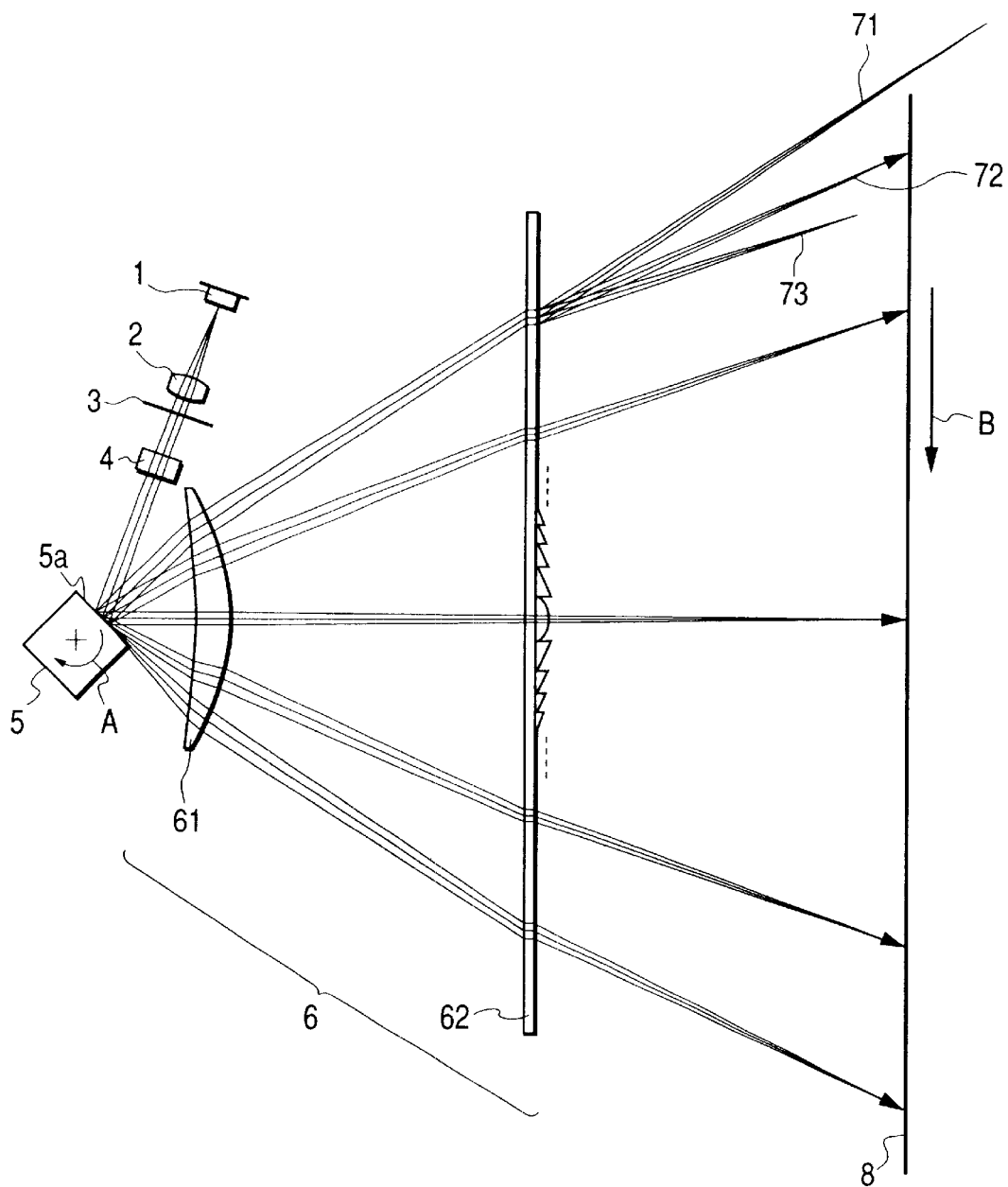
FIG. 7 is a schematic cross sectional view of a principal portion of Embodiment 1 of scanning optical device according to the invention and taken along the main-scanning direction.

FIG. 6 is a schematic perspective view of a principal portion of Embodiment 1 of scanning optical device according to the invention. FIG. 7 is a schematic cross sectional view of the embodiment of FIG. 6 taken along the main-scanning direction thereof. Note that the grating section (diffraction grating) of the diffraction optical element of FIG. 7 is drawn so as to be disproportionally large relative to the remaining components and it may appear differently in an actual system. In FIGS. 6 and 7, the same components are denoted respectively by the same reference symbols.

Referring to FIGS. 6 and 7, there are shown a light source 1 that is typically a semiconductor laser, a collimator lens 2 for transforming the divergent light beam emitted from the light source 1 into a substantially collimated light beam, an aperture stop 3 for limiting (the quantity of light of) the light beam passing therethrough, a cylindrical lens 4 having refractive power of a predetermined level only in the sub-scanning direction and adapted to form a linear image extending in the main-scanning direction of the light beam entering the lens 4 after passing through the aperture stop 3 on the deflection surface (reflection surface) of an optical deflector in the sub-scanning section, i.e., a plane intersecting the optical axis along the sub-scanning direction. In this embodiment, the collimator lens 2 and the cylindrical lens 4 constitute the first optical system.

In FIGS. 6 and 7, reference symbol 5 denotes an optical deflector that is typically a rotary polygon mirror. The optical deflector 5 is driven by a drive means (not shown) such as a motor to rotate at a constant rate in the direction indicated by arrow A.

Reference symbol 6 denotes a scanning optical system that is the second optical system of the embodiment having an fθ feature. The scanning optical system 6 includes a refraction optical element 61 and a diffraction optical element 62. The refraction optical element 61 is formed of a single plastic-made toric lens having power that is differentiated between the main-scanning direction and the sub-scanning direction. The diffraction optical element 62 is a plastic-made oblong element having power that is also differentiated between the main-scanning direction and the sub-scanning direction.

The diffraction grating of the diffraction optical element 62 of this embodiment is so configured that, out of the light beams deflected by the optical deflector 5, the sum of the quantities of light of the diffracted light beams of the adjunctive orders of diffraction (diffracted light beams of the orders of diffraction other than the operational order) of the positive (+) side is made smaller than the sum of the quantities of light of the diffracted light beams of the adjunctive orders of diffraction of the negative (−) side in terms of the predetermined order of diffraction (the light beam of the order of +2 in this embodiment) of the light beams deflected by the optical deflector 5 and located remotest from the optical axis in correspondence to opposite ends of the surface to be scanned 8. The diffraction grating has a profile like that of a blaze.

As for the downstream of the diffraction optical element 62, light beam 72 in FIG. 7 whose central ray is indicated by a solid line is that of the operational (designed) order of diffraction which is the order of +2, whereas light beams 71 and 73 whose central rays are indicated by respective dotted broken lines are those of the orders of +1 and +3. Note that only the light beams of the adjunctive orders 71 and 73 located remotest from the optical axis are shown and those of the adjunctive orders other than the orders of +1 and +3 are not shown in FIG. 7.

While the diffraction optical element 62 of this embodiment is formed from a plastic material by injection molding, a diffraction grating formed on a glass base plate by means of a technique of producing replicas may operate as effectively as a plastic-made element. In this embodiment, the refraction optical element (toric lens) 61 is arranged closer to the optical deflector 5 than to the surface to be scanned as viewed from the middle point of the axis of rotation of the optical deflector 5 and the surface to be scanned 8, whereas the diffraction optical element 62 is arranged closer to the surface to be scanned 8. As pointed out above, these optical elements have power that is differentiated between the main-scanning direction and the sub-scanning direction and are adapted to focus the light beams deflected by the optical deflector 5 on the surface to be scanned and correct the tilt effect of the deflection surface 5a of the optical deflector 5. Reference symbol 8 in FIG. 7 denotes the surface of the photosensitive drum that is the surface to be scanned.

In this embodiment, the divergent light beam that is optically modulated according to the image information applied to it and emitted from the light source (semiconductor laser) 1 is then transformed into a substantially collimated light beam by the collimator lens 2. Then, the quantity of light of the substantially collimated light beam is limited by the aperture stop 3 before entering the cylindrical lens 4. The substantially collimated light beam that enters the cylindrical lens 4 then leaves the latter without being modified in the main-scanning section, i.e., a plane intersecting the optical axis along the main-scanning direction but it is converged in the sub-scanning section so that a substantially linear image (extending in the main-scanning direction) of the light beam is formed on the deflection surface 5a of the optical deflector 5. The light beam deflected by the deflection surface 5a of the optical deflector 5 is then focussed to form a spot of light on the surface to be scanned (surface of the photosensitive drum) 8 by way of the refraction optical element (toric lens) 61 and the diffraction optical element 62. Thus, as the optical deflector 5 is driven to rotate in the sense of arrow A in FIG. 7, the focussed spot of light scans the surface to be scanned (surface of the photosensitive drum) 8 at a constant rate in the sense of arrow B in FIG. 7 (main-scanning direction) to thereby effect image recording on the surface to be scanned 8.

The refraction optical element (toric lens) of the scanning optical system 6 of this embodiment has an aspheric profile in the main-scanning direction that can be expressed by a function of up to the tenth degree. If the intersection of the toric lens and the optical axis is selected for the original point of an xyz coordinate system to use the optical axis as x-axis, an axis perpendicularly intersecting the optical axis in the main-scanning plane as y-axis and an axis perpendicularly intersecting the optical axis in the sub-scanning plane as z-axis, the major axis, i.e., the generatrix of the toric lens corresponding to the main-scanning direction has a profile expressed by formula (1) below;

$$x = \frac{Y^2/R}{1+(1-(1+K)(Y/R)^2)^{1/2}} + B_4 Y^4 + B_6 Y^6 + B_8 Y^8 + B_{10} Y^{10} \quad (1)$$

where R is the radius of curvature and k, $B_4$, $B_6$, $B_8$ and $B_{10}$ are coefficients specific to the aspherical surface.

On the other hand, the refraction optical element (toric lens) 61 has a profile in the sub-scanning direction (direction containing the optical axis and perpendicularly intersecting the main-scanning direction) as expressed by formula (2) below;

$$S = \frac{Z^2/r'}{1+(1-(Z/r')^2)^{1/2}} \quad (2)$$

where $r'=r_0(1+D_2Y^2+D_4Y^4+D_6Y^6+D_8Y^8+D_{10}Y^{10})$, $r_0$ being the radius of curvature of the profile along the minor axis, i.e., the generatrix of the toric lens corresponding to the sub-scanning direction, $D_2$, $D_4$, $D_6$, $D_8$ and $D_{10}$ being so many coefficients specific to the aspheric surface.

The diffraction optical element 62 has a diffraction surface that can be expressed by a function up to the sixth degree in the main-scanning direction and by a topological function of the second degree in the sub-scanning direction that can vary depending on the position in the main-scanning direction. The diffraction surface is expressed by formula (3) below.

$$\phi = m\lambda = b_2 Y^2 + b_4 Y^4 + b_6 Y^6 + (d_0 + d_1 Y + d_2 Y^2 + d_3 Y^3 + d_4 Y^4) Z^2 \quad (3)$$

Table 1 shows the optical parameters, the aspheric surface coefficients of the toric lens and the topological terms of the diffraction optical element of this embodiment. The material of the grating section of the diffraction optical element of this embodiment shows a refractive index of n=1.51742, a wavelength of λ=780 (nm), an angle of incidence of θi=23° for the light beams remotest from the optical axis entering the diffraction grating and a grating pitch of p=10.2 (μm).

TABLE 1

[Embodiment 1]
Design data

| Wavelength, Refractive index | | |
|---|---|---|
| Operational wavelength | λ (nm) | 780 |
| Toric lens 61: refractive index | nt | 1.5242 |
| Oblong diffraction element 62: refractive index | nd | 1.5174 |
| Light beam angles | | |
| Angle of light beam striking polygon | θP | 70.0 |
| Largest angle of light beam leaving polygon | θe | 45.0 |
| Largest angle of beam striking surface to be scanned | Θi | 25.0 |
| Parameters | | |
| Axis of polygon - toric lens | e1 | 36.4 |
| Toric lens: central thickness | d1 | 11.0 |
| Toric lens - oblong diffraction element | e2 | 84.0 |
| Oblong diffraction element: central thickness | d2 | 5.0 |
| Oblong diffraction element - surface to be scanned | Sk | 110.0 |
| Axis of polygon - surface to be scanned | L | 246.4 |
| Effective scanning width | W | 297.0 |

| Toric lens 61 - surface profile | | |
|---|---|---|
| | First surface | Second surface |
| R | −1.35783E+02 | −6.04233E+01 |
| K | 4.17022E+00 | −8.75648E−01 |
| B4 | 1,37112E−06 | 3.83004E−07 |
| B6 | 5.24619E−11 | 3.28798E−10 |
| r | 1.59913E+02 | −2.48635E+01 |
| D2s | | 1.68333E−04 |
| D4s | | −3.18557E−08 |
| D6s | | 4.15786E−11 |
| D2e | | 2.38590E−04 |
| D4e | | −9.76073E−08 |
| D6e | | 7.54447E−11 |

Suffix "s" donates the laser side.
Suffix "e" donates the side opposite to the laser.

TABLE 1-continued

[Embodiment 1]
Design data

Oblong diffraction elements 62 - surface profile

| | First surface | Second surface |
|---|---|---|
| R | ∞ | ∞ |
| K | | |
| B4 | | |
| B6 | | |

Oblong diffraction element 62 - topological terms

| | First surface | Second surface |
|---|---|---|
| b2 | | −2.07762E−04 |
| b4 | | −4.64730E−08 |
| b6 | | 1.36264E−12 |
| d0 | | −5.78927E−03 |
| d1 | | −9.63717E−07 |
| d2 | | 1.14582E−07 |
| d3 | | 3.74888E−11 |
| d4 | | −2.14049E−12 |

Figure 8:
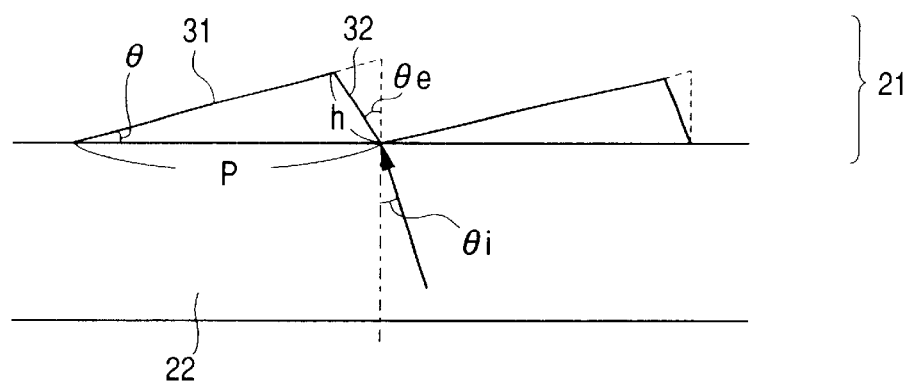
FIG. 8 is a schematic cross sectional view of a principal portion of the diffraction optical element of Embodiment 1 of the invention taken along the main-scanning direction.

FIG. 8 is a schematic cross sectional view of a principal portion of the diffraction optical element of Embodiment 1 of the invention taken along the main-scanning direction, showing the grating section in an enlarged scale. Note that only a unit cell of the grating is shown in FIG. 8.

Referring to FIG. 8, each unit cell of the diffraction grating 21 comprises in principle an inclined section 31 for generating power and a wall section 32 connecting the inclined section 31 and the base plate 22. The base plate 22 and the inclined section 31 form a blaze angle θ therebetween, while the inclined section 31 and the wall section 32 always form a right angle therebetween.

As pointed out above, the diffraction grating of the diffraction optical element 62 of this embodiment is so configured that, out of the light beams deflected by the optical deflector 5, the sum of the quantities of light of the diffracted light beams of the adjunctive orders of diffraction of the positive (+) side is made smaller than the sum of the quantities of light of the diffracted light beams of the orders of diffraction of the negative (−) side in terms of the light beams of the operational order of diffraction (the light beam of the order of +2) deflected by the optical deflector 5 and located remotest from the optical axis in correspondence to opposite ends of the surface to be scanned 8. The blaze angle θ of the diffraction grating at the positions where the light beams remotest from the optical axis pass through the diffraction optical element 62 is expressed by formula (4) below;

$$\theta = \sin^{-1}\{m\lambda/p(n-1)\} \quad (4)$$

where m is the predetermined order of diffraction, λ is the wavelength of the light beams, p is the grating pitch of the diffraction grating and n is the refractive index of the diffraction optical element in the area where the diffraction grating is formed. In this embodiment, θ=17.811° at the positions where the light beams remotest from the optical axis pass through the diffraction optical element 62.

Formula (5) below may be used in place of formula (4) above to express the blaze angle θ of the diffraction grating at the positions where the light beams remotest from the optical axis pass through the diffraction optical element 62.

$$\theta = \tan^{-1}\{m\lambda/p(n-1)\} \quad (5)$$

Figure 9:
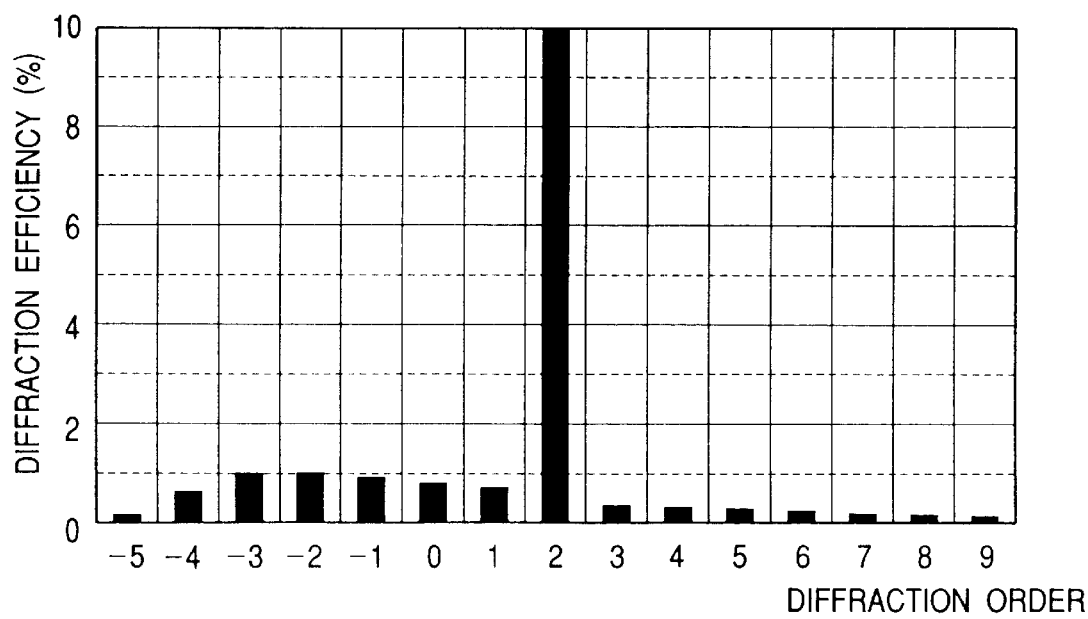
FIG. 9 is a graph showing the diffraction efficiency for the operational order of diffraction and those for the adjunctive orders of diffraction of Embodiment 1 of the invention.

FIG. 9 is a graph showing the diffraction efficiency for the operational order of diffraction and those for the adjunctive orders of diffraction of this embodiment of the invention. Note that the diffraction efficiencies are determined by means of a technique of close-coupled wave analysis.

From FIG. 9, it will be seen that the sum of the quantities of light of the diffracted light beams of the adjunctive orders of diffraction of the positive (+) side is made smaller than the sum of the quantities of light of the diffracted light beams of the orders of diffraction of the negative (−) side in terms of the operational order of diffraction.

Thus, this embodiment provides the advantage of reducing the quantity of light of the light beams of the orders of diffraction of the positive (+) side that is abundantly used for exposure because of a relatively slow scanning speed and the diffraction directed toward the inside the of effective image area.

With this embodiment, it is now possible to realize a high definition scanning optical device comprising a diffraction optical element that can effectively reduce the influence of flare and ghost due to diffracted light beams of the orders of diffraction of the positive (+) side that can be a problem when using the device by way of a simple method of selecting an appropriate value for the blaze angle of the diffraction grating of the diffraction optical element without reducing the diffraction efficiency of the operational order of diffraction.

[Embodiment 2]

Figure 10:
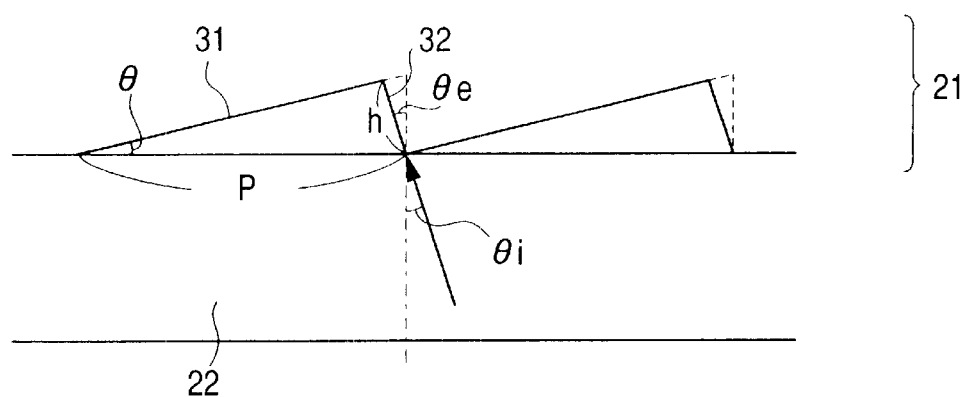
FIG. 10 is a schematic cross sectional view of a principal portion of the diffraction optical element of Embodiment 2 of the invention taken along the main-scanning direction.

FIG. 10 is a schematic cross sectional view of a principal portion of the diffraction optical element of Embodiment 2 of the invention taken along the main-scanning direction, showing the grating section in an enlarged scale. In FIG. 10, the components same as those of FIG. 8 are denoted respectively by the same reference symbols and will not be described any further. Note that only a unit cell of the grating is shown in FIG. 10.

This embodiment differs from Embodiment 1 only in that the method of selecting the value for the blaze angle θ of the diffraction grating is different from that of Embodiment 1. More specifically, in this embodiment, the sum of the quantities of light of the diffracted light beams of the orders of diffraction of the positive (+) side is made smaller than the sum of the quantities of light of the diffracted light beams of the orders of diffraction of the negative (−) side relative to the light beam of the operational order of diffraction (the light beam of the order of +2) in terms of the light beams of the operational order of diffraction deflected by the optical deflector and located not only remotest from the optical axis in correspondence to opposite ends of the surface to be scanned but over the entire surface to be scanned. Otherwise, this embodiment is substantially same as Embodiment 1 particularly in terms of the parameters and the grating pitch selected for the scanning optical element and hence provides advantages substantially same as those of Embodiment 1.

In this embodiment, the blaze angle θ of the diffraction grating of the diffraction optical element is so selected as to satisfy the requirement of formula (5) above. Additionally, θ=17.008° is used for the light beams passing through the diffraction grating.

Alternatively, a blaze angle θ satisfying formula (4) above may be selected for the diffraction grating of the diffraction optical element.

Figure 11:
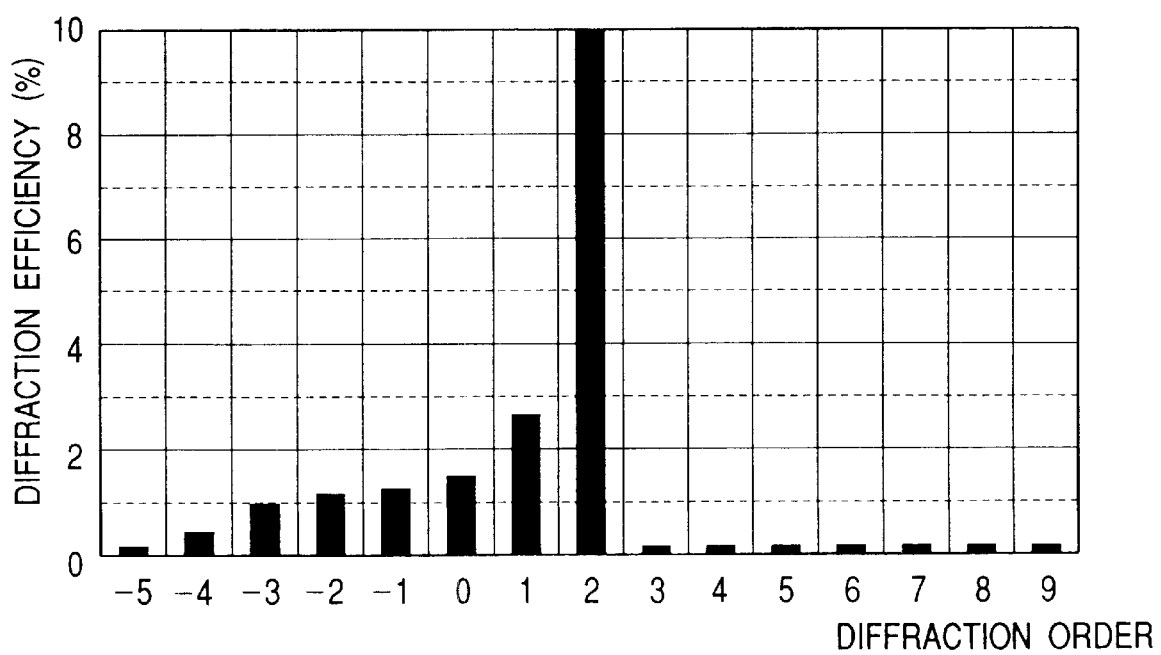
FIG. 11 is a graph showing the diffraction efficiency for the operational order of diffraction and those for the adjunctive orders of diffraction of Embodiment 2 of the invention.

FIG. 11 is a graph showing the diffraction efficiency for the operational order of diffraction and those for the adjunctive orders of diffraction of Embodiment 2 of the invention. Note that the diffraction efficiencies are determined by means of a technique of close-coupled wave analysis.

From FIG. 11, it will be seen that the sum of the quantities of light of the diffracted light beams of the adjunctive orders of diffraction of the positive (+) side is made smaller than the sum of quantities of light of the diffracted light beams of the orders of diffraction of the negative (−) side in terms of the operational order of diffraction.

Figure 12:
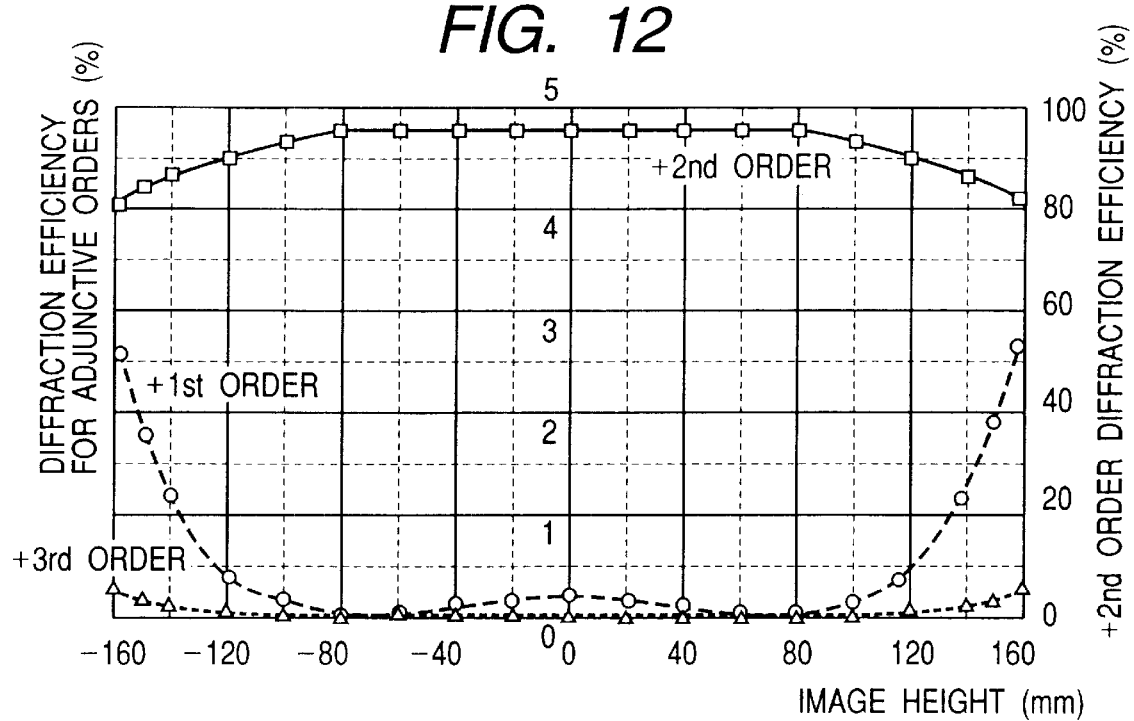
FIG. 12 is a graph showing the diffraction efficiency for the adjacent orders of diffraction of Embodiment 2 of the invention as viewed in terms of different image heights.

FIG. 12 is a graph showing the diffraction efficiency for the adjacent orders (m=+1, +3) of diffraction of Embodiment 2 of the invention as viewed in terms of different image heights. While only the adjacent orders are shown in FIG. 12, it will be seen that the diffraction efficiency of the light beam of the +3rd order of diffraction, or the order of the positive (+) side, is made smaller than that of the light beam of the +1st order of diffraction, or the order of the negative (−) side.

Thus, this embodiment provides the advantage of reducing the quantity of light of the light beams of the orders of diffraction of the positive (+) side that is abundantly used for exposure because of a relatively slow scanning speed and the diffraction directed toward the inside the of effective image area.

With this embodiment, it is now possible to realize a high definition scanning optical device comprising a diffraction optical element that can effectively reduce the influence of flare and ghost due to diffracted light beams of the orders of diffraction of the positive (+) side that can be a problem when using the device by way of a simple method of selecting an appropriate value for the blaze angle of the diffraction grating of the diffraction optical element without reducing the diffraction efficiency of the operational order of diffraction. Particularly, this embodiment has a feature of reducing the influence of flare and ghost over the entire image area by selecting an appropriate value for the blaze angle of the diffraction grating over the entire effective image area.

[Embodiment 3]

Now, Embodiment 3 of the invention will be described below. This embodiment differs from Embodiment 1 only in that the method of selecting the value for the blaze angle θ of the diffraction grating is different from that of Embodiment 1. More specifically, in this embodiment, the profile of the diffraction grating is so devised that the sum of the quantities of light of the diffracted light beams of the orders of diffraction of the positive (+) side is made equal to the sum of the quantities of light of the diffracted light beams of the orders of diffraction of the negative (−) side for exposure by taking not only the quantity of light of the adjunctive orders of diffraction but also the scanning speed at opposite ends of the surface to be scanned. Otherwise, this embodiment is substantially same as Embodiment 1 particularly in terms of the parameters and the grating pitch selected for the scanning optical element and hence provides advantages substantially same as those of Embodiment 1.

Thus, the diffraction grating of the diffraction optical element of this embodiment is so configured that, out of the light beams deflected by the optical deflector, the light beams of the operational order of diffraction (the light beam of the order of +2) used to form a light spot on the surface to be scanned are made to satisfy the requirement of formula (6) below at the positions where the light beams located remotest from the optical axis in correspondence to opposite ends of the surface to be scanned pass through the diffraction optical element;

$$0.5 < (P_{m-1}/V_{m31\ 1})/(P_{m+1}/V_{m+1}) < 2.0 \quad (6)$$

where m is the predetermined order of diffraction, $P_x$ is the intensity of the diffracted light beam of the x-th order of diffraction and $V_x$ is the scanning speed of the diffracted light beam of the x-th order of diffraction on the surface to be scanned.

In this embodiment, the blaze angle θ of the diffraction grating of the diffraction optical element is θ=17.30° at the positions where the light beams remotest from the optical axis pass through the diffraction optical element 62. With this arrangement, the amount of light exposure on the surface to be scanned is made equal for each adjacent adjunctive order of diffraction.

Figure 13:
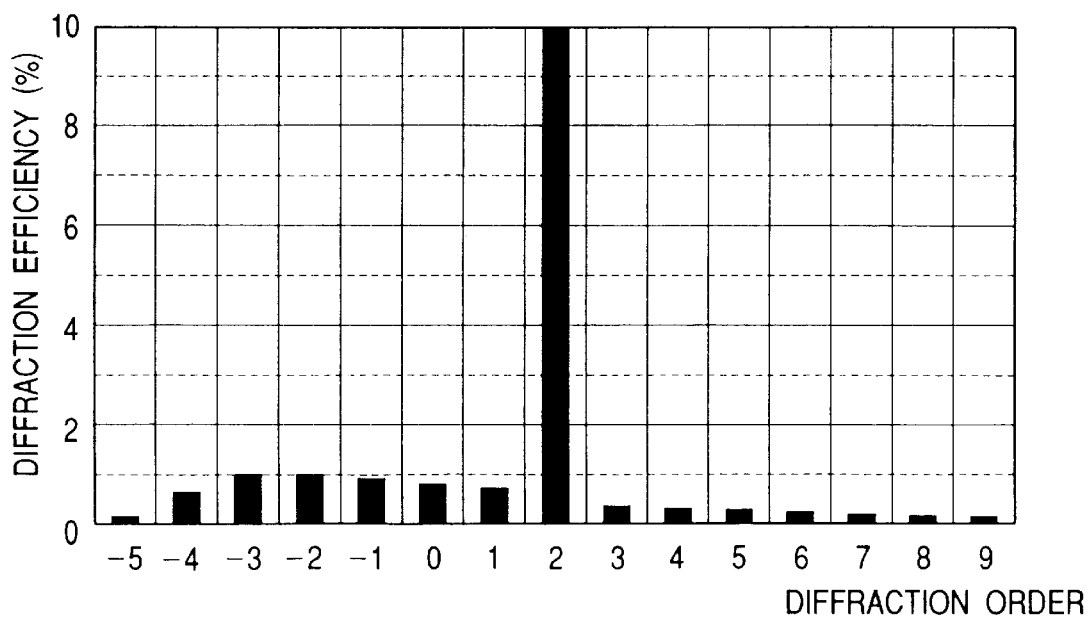
FIG. 13 is a graph showing the diffraction efficiency for the operational order of diffraction and those for the adjunctive orders of diffraction of Embodiment 3 of the invention.

FIG. 13 is a graph showing the diffraction efficiency for the operational order of diffraction and those for the adjunctive orders of diffraction of Embodiment 3 of the invention. Note that the diffraction efficiencies are determined by means of a technique of close-coupled wave analysis.

From FIG. 13, it will be seen that the intensity of light $P_1$ of the light beam of the first order of diffraction and the intensity of light $P_3$ of the light beam of the third order of diffraction are respectively $P_1$=0.56% and $P_3$=0.42%. The scanning speeds Vx for the respective orders of diffraction are $V_1$=9.47×10$^5$ mm/sec and $V_3$=7.38×10$^5$ mm/sec. The ratio of the quantity of light exposure of the first order of diffraction to that of the quantity of light exposure of the third order as obtained by using the scanning speeds is $$(P_1/V_1)/(P_3/V_3)=1.04.$$

This means that the diffraction grating is so profiled that the quantity of light of the adjunctive orders of diffraction of the positive (+) side is made smaller than that of the adjunctive orders diffraction of the negative (−) side and, at the same time, the quantity of light to be used for exposure is equalized between the positive (+) side and the negative (−) side by taking the scanning speed into consideration.

Now, the scanning speed for each adjunctive order of diffraction will be discussed below. The scanning speed of the light beam of the operational order of diffraction (+1 in this embodiment) is expressed by formula (7) below;

$$Vs=2\ fS\times(2\pi/60)\text{(mm/sec)} \quad (7)$$

where f is the fθ coefficient and S is the number of revolutions per unit time of the motor for driving the polygon mirror to rotate. The scanning speed of the light beam of each adjunctive order of diffraction cannot be determined unequivocally because a different fθ coefficient is involved. Therefore, in this embodiment, the position at which the light beam of each adjunctive order of diffraction is determined by tracing the light beam and differentiated by time to obtain the scanning speed.

If the ratio of the above described quantities of light meets the requirement of formula (6), the diffraction efficiency of the light beam of the operational order of diffraction practically does not change so that the influence of the light beams of the adjunctive orders of diffraction of the positive (+) side and that of the light beams of the adjunctive orders of diffraction of the negative (−) side can be equalized to make the embodiment operate highly effectively. Additionally, the quantity of light of the light beams of the adjunctive orders of diffraction is preferably held to less than 2% of that of the light beam of the operational order of diffraction. As a matter of fact, this embodiment satisfies this requirement as well.

With this embodiment, it is now possible to realize a high definition scanning optical device comprising a diffraction optical element that can effectively reduce the influence of flare and ghost due to diffracted light beams of the orders of diffraction of the positive (+) side that can be a problem when using the device by way of a simple method of selecting an appropriate value for the blaze angle of the diffraction grating of the diffraction optical element without reducing the diffraction efficiency of the operational order of diffraction.

Particularly, this embodiment has a feature of reducing not only the influence of flare and ghost due to the diffracted light beams of the adjunctive orders of diffraction of the positive (+) side but also the influence due to the diffracted light beams of the adjunctive orders of the negative (−) side by substantially equalizing the quantity of light exposure at the positive (+) side to that of light exposure at the negative (−) side, taking the scanning speed into consideration.

While the diffraction grating of this embodiment is so configured as to equalize the exposure quantity of light of the adjunctive orders of diffraction at the positive (+) side to that of light at the negative (−) side in terms of opposite ends of the surface to be scanned, a further high definition scanning optical device can be realized when the requirement of formula (6) is made to satisfy over the entire area of the surface to be scanned.

Figure 14:
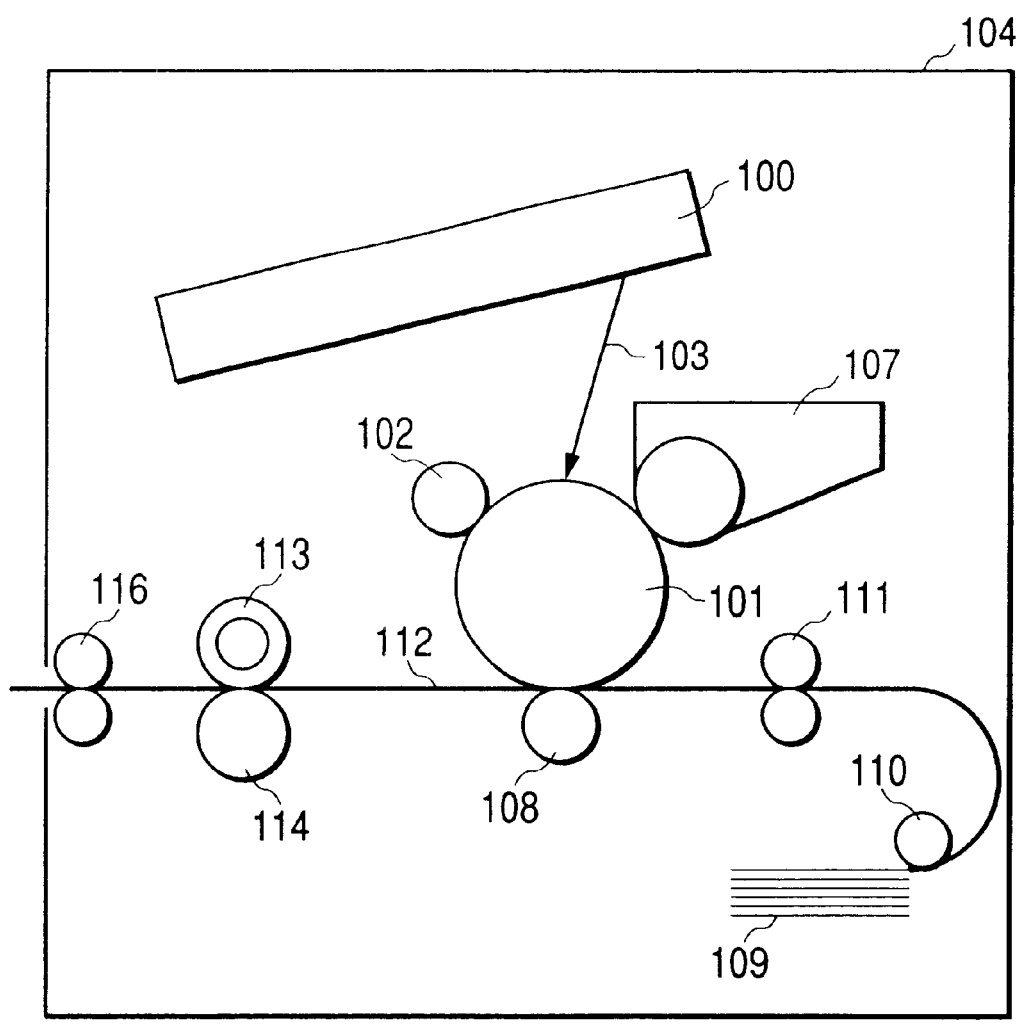
FIG. 14 is a schematic cross sectional view of a principal portion of an image forming apparatus comprising a scanning optical device according to the invention and taken along the sub-scanning direction.

FIG. 14 is a schematic cross sectional view of an image forming apparatus comprising a scanning optical device according to the invention and taken along the sub-scanning direction. In FIG. 14, reference numeral 104 denotes the image forming apparatus and reference numeral 100 denotes any of Embodiments 1 through 3 of scanning optical device according to the invention. Reference numeral 101 denotes a photosensitive drum operating as an electrostatic latent image carrier. A charging roller 102 adapted to charge the surface of the photosensitive drum 101 uniformly with electricity is arranged above and held in contact with the photosensitive drum 101. The electrically charged area of the surface of the photosensitive drum 101 located downstream relative to the contact line of the charging roller 102 and the drum 101 is scanned by the light beams 103 emitted from the scanning optical device 100.

The light beams 103 are modulated according to the image data applied to the optical scanner so that an electrostatic latent image is formed on the surface of the photosensitive drum 101 as the latter is irradiated with the light beams 103. The electrostatic latent image is then developed into a toner image by means of a developing device 107 arranged downstream relative to the area of the photosensitive drum 101 irradiated with the light beam 103 in the sense of rotation of the drum 101 and also held in contact with the photosensitive drum 101. The toner image is then transferred onto a sheet of paper 112 by a transfer roller 108 arranged vis-a-vis the photosensitive drum 101 at a position below the latter. The sheet of paper 112 is fed from a sheet cassette 109 arranged in front of the photosensitive drum 101 (right to the drum 101 in FIG. 14), although it may alternatively be fed with hand. A feed roller 110 is arranged at an end of the sheet cassette 109 and adapted to feed a sheet of paper at a time from the cassette 109 to the transfer route by way of a register roller 111.

Then, the sheet 112 now carrying the unfixed toner image is moved to a fixing device located behind the photosensitive drum 101 (left to the drum 101 in FIG. 14). The fixing device comprises a fixing roller 113 provided in the inside with fixing heater (not shown) and a press roller 114 for pressing the fixing roller 113 so that the toner image on the sheet 112 moved from the transfer section is fixed as the sheet is pressed and heated between the fixing roller 113 and the press roller 114. A pair of delivery rollers 116 are arranged behind the fixing roller 113 to deliver the sheet 112 now carrying a fixed image to the outside of the image forming apparatus.

The present invention can find various applications besides the above described embodiments. The present invention covers any such applications without departing from the scope of the invention specifically defined by the appended claims.

What is claimed is:

1. A scanning optical device comprising:

a light source;

an optical deflector for deflecting the light beam emitted from said light source;

a first optical system for leading the light beam emitted from said light source to said optical deflector; and a second optical system for focussing the light beam deflected by said optical deflector on a surface to be scanned;

said second optical system having at least a diffraction optical element and being adapted to form a light spot on the surface to be scanned by using the diffracted light beam of a predetermined order of diffraction out of the light beams diffracted by the diffraction optical element, said diffraction optical element being so configured as to make the sum of the quantities of light of the diffracted light beams of the orders of diffraction of the positive side relative to the predetermined order of diffraction smaller than the sum of the quantities of light of the diffracted light beams of the orders of diffraction of the negative side relative to the predetermined order of diffraction for the light beams deflected by the optical deflector and located remotest from the optical axis.

2. A scanning optical device according to claim 1, wherein the diffraction grating of said diffraction optical element has a blaze-shaped profile.

3. A scanning optical device according to claim 2, wherein the blaze angle θ of said diffraction grating is expressed by formula below at the positions where the light beams remotest from the optical axis pass through the diffraction optical element;

θ=tan$^{-1}${mλ/p(n−1)}, where m is the predetermined order of diffraction, λ is the wavelength of the light beams, p is the grating pitch of the diffraction grating and n is the refractive index of the diffraction optical element in the area where the diffraction grating is formed.

4. A scanning optical device according to claim 2, wherein the blaze angle θ of said diffraction grating is expressed by formula below at the positions where the light beams remotest from the optical axis pass through the diffraction optical element;

θ=sin$^{-1}${mλ/p(n−1)}, where m is the predetermined order of diffraction, λ is the wavelength of the light beams, p is the grating pitch of the diffraction grating and n is the refractive index of the diffraction optical element in the area where the diffraction grating is formed.

5. A scanning optical device according to claim 1, wherein said first optical system includes a collimator lens for collimating the light beam emitted from the light source and a cylindrical lens for focussing the light beam transmitted through the collimator lens on the deflection surface of said optical deflector to form a long linear image extending in the main-scanning direction.

6. A scanning optical device according to claim 1, wherein said optical deflector is a polygon mirror.

7. A scanning optical device according to claim 1, wherein said second optical system includes a plastic-made toric lens and a diffraction optical element.

8. A scanning optical device according to claim 7, wherein
the change in the aberration of the toric lens due to a reduced refractive index of said toric lens is compensated by the change in the aberration of the diffraction optical element due to wave fluctuations of the light source if the ambient temperature rises.

9. A scanning optical device comprising:

a light source;

an optical deflector for deflecting the light beam emitted from said light source;

a first optical system for leading the light beam emitted from said light source to said optical deflector; and a second optical system for focussing the light beam deflected by said optical deflector on a surface to be scanned;

said second optical system having at least a diffraction optical element and being adapted to form a light spot on the surface to be scanned by using the diffracted light beam of a predetermined order of diffraction out of the light beams diffracted by the diffraction optical element, said diffraction optical element being so configured as to make the sum of the quantities of light of the diffracted light beams of the orders of diffraction of the positive side relative to the predetermined order of diffraction smaller than the sum of the quantities of light of the diffracted light beams of the orders of diffraction of the negative side relative to the predetermined order of diffraction for any light beams located within the scope of scanning.

10. A scanning optical device according to claim 9, wherein
the diffraction grating of said diffraction optical element has a blaze-shaped profile.

11. A scanning optical device according to claim 10, wherein
the blaze angle θ of said diffraction grating is expressed by formula below at the positions where the light beams remotest from the optical axis pass through the diffraction optical element;

$$\theta = \tan^{-1}\{m\lambda/p(n-1)\},$$

where m is the predetermined order of diffraction, λ is the wavelength of the light beams, p is the grating pitch of the diffraction grating and n is the refractive index of the diffraction optical element in the area where the diffraction grating is formed.

12. A scanning optical device according to claim 10, wherein
the blaze angle θ of said diffraction grating is expressed by formula below at the positions where the light beams remotest from the optical axis pass through the diffraction optical element;

$$\theta = \sin^{-1}\{m\lambda/p(n-1)\},$$

where m is the predetermined order of diffraction, λ is the wavelength of the light beams, p is the grating pitch of the diffraction grating and n is the refractive index of the diffraction optical element in the area where the diffraction grating is formed.

13. A scanning optical device according to claim 9, wherein
said first optical system includes a collimator lens for collimating the light beam emitted from the light source and a cylindrical lens for focussing the light beam transmitted through the collimator lens on the deflection surface of said optical deflector to form a long linear image extending in the main-scanning direction.

14. A scanning optical device according to claim 9, wherein
said optical deflector is a polygon mirror.

15. A scanning optical device according to claim 9, wherein
said second optical system includes a plastic-made toric lens and a diffraction optical element.

16. A scanning optical device according to claim 15, wherein
the change in the aberration of the toric lens due to a reduced refractive index of said toric lens is compensated by the change in the aberration of the diffraction optical element due to wave fluctuations of the light source if the ambient temperature rises.

17. A scanning optical device comprising:

a light source;

an optical deflector for deflecting the light beam emitted from said light source;

a first optical system for leading the light beam emitted from said light source to said optical deflector; and a second optical system for focussing the light beam deflected by said optical deflector on a surface to be scanned;

said second optical system having at least a diffraction optical element and being adapted to form a light spot on the surface to be scanned by using the diffracted light beam of a predetermined order of diffraction out of the light beams diffracted by the diffraction optical element, said diffraction optical element being so configured as to satisfy the requirement of the formula below in terms of the light beams deflected by the optical deflector and located remotest from the optical axis;

$$0.5 < (P_{m-1}/V_{m-1})/(P_{m+1}/V_{m+1}) < 2.0,$$

m being the predetermined order of diffraction, $P_x$ being the intensity of a diffracted light beam of the x-th order of diffraction, $V_x$ being the scanning speed of a diffracted light beam of the x-th order of diffraction on the surface to be scanned.

18. A scanning optical device according to claim 17, wherein
the diffraction grating of said diffraction optical element has a blaze-shaped profile.

19. A scanning optical device according to claim 17, wherein
said first optical system includes a collimator lens for collimating the light beam emitted from the light source and a cylindrical lens for focussing the light beam transmitted through the collimator lens on the deflection surface of said optical deflector to form a long linear image extending in the main-scanning direction.

20. A scanning optical device according to claim 17, wherein
said optical deflector is a polygon mirror.

21. A scanning optical device according to claim 17, wherein
said second optical system includes a plastic-made toric lens and a diffraction optical element.

22. A scanning optical device according to claim 21, wherein the change in the aberration of the toric lens due to a reduced refractive index of said toric lens is compensated by the change in the aberration of the diffraction optical element due to wave fluctuations of the light source if the ambient temperature rises.

23. An image forming apparatus comprising:

a scanning optical device according to any of claims 1 through 22;

a photosensitive member arranged at the surface to be scanned;

a developing unit for developing an electrostatic latent image formed on the surface of said photosensitive member by the light beams made to scan the surface by means of said scanning optical device into a toner image;

a transfer unit for transferring said developed toner image onto a toner image receiving member; and a fixing unit for fixing the transferred toner image on the toner image receiving member.

* * * * *

UNITED STATES PATENT AND TRADEMARK OFFICE
CERTIFICATE OF CORRECTION

PATENT NO. : 6,366,386 B1
DATED : April 2, 2002
INVENTOR(S) : Manabu Kato

It is certified that error appears in the above-identified patent and that said Letters Patent is hereby corrected as shown below:

Column 2,
Line 10, "provide" should read -- provides --.

Column 3,
Line 45, "ghost," should read -- ghost. --.

Column 8,
Line 8, "generatirix" should read -- generatrix --.

Column 10,
Line 13, "the of" should read -- of the --.

Column 11,
Line 17, "the of" should read -- of the --; and
Line 61, "$V_{M311}$" should read -- $V_{M-1}$ --.

Column 15,
Line 42, "$\ominus = \tan^{31}$" should read -- $\ominus = \tan^{-1}$ --.

Signed and Sealed this

Eighteenth Day of June, 2002

Attest:

JAMES E. ROGAN
Attesting Officer
Director of the United States Patent and Trademark Office

UNITED STATES PATENT AND TRADEMARK OFFICE
CERTIFICATE OF CORRECTION

PATENT NO.    : 6,366,386 B1                                        Page 1 of 1
DATED         : April 2, 2002
INVENTOR(S)   : Kato It is certified that error appears in the above-identified patent and that said Letters Patent is hereby corrected as shown below:

<u>Title page,</u>
Item [*] Notice, delete the phrase "by 0 days" and insert -- by 82 days --

Signed and Sealed this

Thirtieth Day of March, 2004

JON W. DUDAS
*Acting Director of the United States Patent and Trademark Office*